United States Patent
Young et al.

(10) Patent No.: US 10,873,950 B2
(45) Date of Patent: Dec. 22, 2020

(54) NETWORK SLICE SELECTION BASED ON REQUESTED SERVICE

(71) Applicant: Verizon Patent and Licensing Inc., Arlington, VA (US)

(72) Inventors: Kristen S. Young, Morris Plains, NJ (US); Kalyani Bogineni, Hillsborough, NJ (US); Jignesh S. Panchal, Hillsborough, NJ (US); Ratul Kumar Guha, Warwick, PA (US)

(73) Assignee: Verison Patent and Licensing Inc., Basking Ridge, NJ (US)

( * ) Notice: Subject to any disclaimer, the term of this patent is extended or adjusted under 35 U.S.C. 154(b) by 42 days.

(21) Appl. No.: 16/217,647

(22) Filed: Dec. 12, 2018

(65) Prior Publication Data
US 2020/0196315 A1 Jun. 18, 2020

(51) Int. Cl.
*H04W 72/04* (2009.01)
*H04W 24/02* (2009.01)
*H04W 72/08* (2009.01)

(52) U.S. Cl.
CPC ....... *H04W 72/0493* (2013.01); *H04W 24/02* (2013.01); *H04W 72/08* (2013.01)

(58) Field of Classification Search
CPC .. H04W 72/0493; H04W 24/02; H04W 72/08
See application file for complete search history.

(56) References Cited

U.S. PATENT DOCUMENTS

| | | | | |
|---|---|---|---|---|
| 2017/0289791 | A1* | 10/2017 | Yoo | H04W 68/005 |
| 2017/0303259 | A1* | 10/2017 | Lee | H04W 72/048 |
| 2018/0317134 | A1* | 11/2018 | Leroux | H04W 24/02 |
| 2019/0029065 | A1* | 1/2019 | Park | H04W 76/27 |
| 2019/0223055 | A1* | 7/2019 | Bor Yaliniz | H04L 41/5054 |
| 2019/0357129 | A1* | 11/2019 | Park | H04W 60/00 |
| 2019/0387411 | A1* | 12/2019 | Choi | H04W 24/02 |
| 2020/0059407 | A1* | 2/2020 | Lu | H04L 41/28 |

FOREIGN PATENT DOCUMENTS

WO  WO-2019029310 A1 * 2/2019 ........... H04W 48/18

* cited by examiner

*Primary Examiner* — Hassan Kizou
*Assistant Examiner* — Mahbubul Bar Chowdhury

(57) ABSTRACT

An example method can include receiving, from a user equipment, single-network slice selection assistance information (S-NSSAI). The method can include determining a resource sharing configuration (RSC) associated with the S-NSSAI and determining whether the S-NSSAI is associated with a network slice instance (NSI) of the network. When the S-NSSAI is determined to be associated with a first NSI, the method can include mapping the S-NSSAI to the first NSI to permit the user equipment to communicate via the first NSI using a protocol data unit (PDU) session associated with the S-NSSAI. When the S-NSSAI is not determined to be associated with an NSI, the method can include forming a second NSI of the network according to the RSC associated with the S-NSSAI and mapping the S-NSSAI to the second NSI to permit the user equipment to communicate via the second NSI using a PDU session associated with the S-NSSAI.

20 Claims, 7 Drawing Sheets

NETWORK SLICE SELECTION BASED ON REQUESTED SERVICE

BACKGROUND

5G/New Radio (5G/NR) is a next generation global wireless standard. 5G/NR provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like.

DETAILED DESCRIPTION OF PREFERRED EMBODIMENTS

Figure 1A:
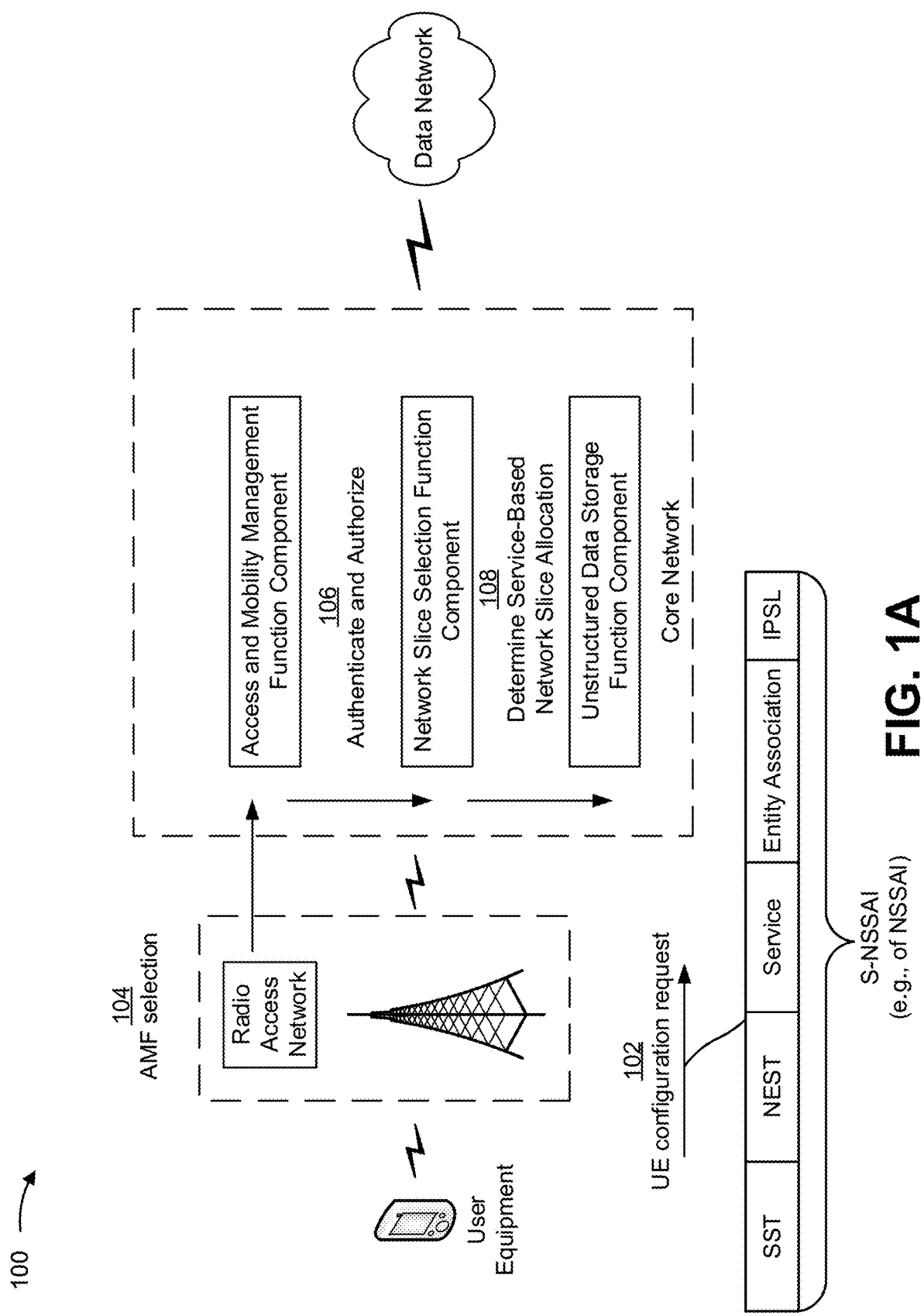
FIGS. 1A-1C is a diagram of an example implementation described herein.

The following detailed description of example implementations refers to the accompanying drawings. The same reference numbers in different drawings can identify the same or similar elements.

In a wireless telecommunications system (which can be referred to herein as "the system"), such as a 5G wireless telecommunications network, network slicing allows for multiple virtual networks to run on a single physical network to support multiple services, applications, and/or entities (e.g., end users, customers, such as organizations that provide a service to end users of the wireless telecommunications systems, and/or the like). In some instances, when a user equipment (UE) requests a connection (e.g., protocol data unit (PDU) connectivity) to the network for an application and/or service, the UE provides the network with information associated with the UE, the application, and/or the service. Such information can include network slice selection assistance information (NSSAI), which can include a collection or list of individual, single-network slice selection assistance information (S-NSSAI) (which can be referred to herein individually as "S-NSSAI" or collectively as "S-NSSAIs") that identify respective network slices associated with the UE. In such cases, a network slice selection function (NSSF) of the system can determine a network slice instance (NSI) (e.g., a virtual network of network functions (NFs) and other resources to support one or more S-NSSAIs) for the S-NSSAI. The NSSF can provide, to an access and mobility management function (AMF), an NSI identifier (NSI ID) associated with the NSI. Further, the AMF can identify a session management function (SMF) to provision a communication session of a network slice, using the corresponding NSI, for the UE. However, information elements of the S-NSSAI are not defined to enable the NSSF to select and/or determine an NSI based on certain characteristics of a communication session. According to previous techniques, when determining the NSI, the NSSF might only consider a slice/service type (SST) of the S-NSSAI that identifies whether the UE is associated with an enhanced mobile broadband (eMBB) service, an ultra-reliable, low-latency (URLLC) service, or a mobile Internet of Things (mIoT) service.

Furthermore, the system can use a network slice subnet instance (NSSI) that can be shared by multiple NSIs. In other words, the NSSI can be considered a virtual network within a virtual network. However, the system does not define and/or set any relationships between the NSSIs and S-NSSAIs or enable the NSSF to use such relationships for service-based network slice selection. In some cases, the NSSF can indicate, to the AMF, which set of S-NSSAIs a UE can be allowed to use. However, according to previous techniques, an NSSF of the system is not configured to determine an NSI for an S-NSSAI (e.g., processes and/or data to perform the process cannot be defined to permit the NSSF to determine the NSSI for an S-NSSAI).

Some implementations described herein enable an NSSF of a core network of a telecommunications system (e.g., a 5G wireless telecommunications network) to define information elements of an S-NSSAI to enable the NSSF to perform service-based NSI selection. Furthermore, some implementations described herein can use NSSIs as resource sharing configurations (RSCs) and define a relationship between the S-NSSAI and an RSC. Moreover, some implementations described herein enable an NSSF to select and/or identify an NSI according to the RSC based on mappings of the S-NSSAIs to NSIs and/or RSCs.

Accordingly, some implementations described herein enable an S-NSSAI to be mapped to an NSI according to a service associated with the S-NSSAI. For example, as described herein, an NSSF can receive, from a UE, an S-NSSAI, determine a RSC associated with the S-NSSAI, and determine, based on the RSC, whether the S-NSSAI is associated with an NSI. If the NSSF determines that the S-NSSAI is associated with the NSI, the NSSF can map the S-NSSAI to the NSI (e.g., using an unstructured data storage function (UDSF) of the core network). Additionally, or alternatively, if the NSSF determines that the S-NSSAI is not associated with the NSI, the NSSF can determine that a new NSI is to be formed, can cause an NSI to be formed according to the RSC and map the S-NSSAI to the formed NSI. In this way, the NSSF can identify and/or associated an S-NSSAI to an NSI to permit the UE to engage in a PDU session associated with an S-NSSAI.

In this way, some implementations described herein permit service-based network slicing. As described herein, an S-NSSAI can be used to represent a type of a network slice that is to be used to create an NSI and/or can be used to identify an existing NSI. Furthermore, because some resources of a network can be shared, end-to-end, in a wireless communication system, some resources can be dedicated to one or more customers based on a service level agreement (SLA) with the one or more customers. Accordingly, some implementations described herein permit an NSSF to define and form an NSI that incorporates flexible resource sharing to meet objectives of various use cases, customers, and/or SLAs. Furthermore, some implementations described herein enable an NSSF to make a deterministic selection of an NSI, from existing NSIs, according to an S-NSSAI to enable an NSSF to provide differentiation, deliver services, and/or maintain SLAs. Therefore, the NSSF can associate an S-NSSAI with an NSI to ensure that network resources are efficiently allocated for communication sessions involving one or more UEs and a data network, such that an adequate amount of resources are provided for each communication session without overloading the network. Therefore, computing resources (e.g., processing resources and/or memory resources) associated with one or more components of a core network and/or network resources (e.g., resource blocks) associated with the core network are not wasted by over-allocating resources and/or under-allocating resources for a communication session that uses an S-NSSAI.

Figure 1B:
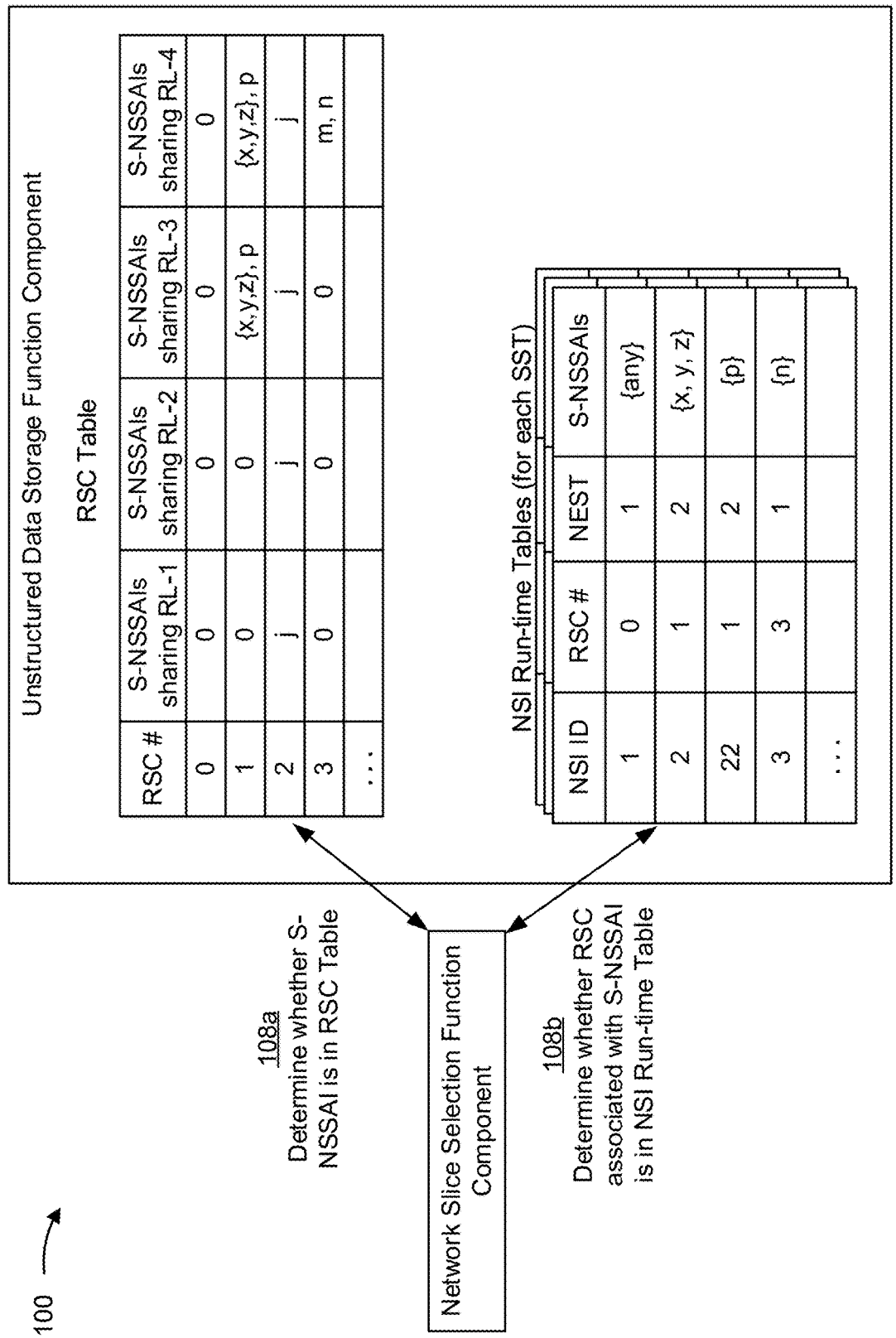
Figure 1C:
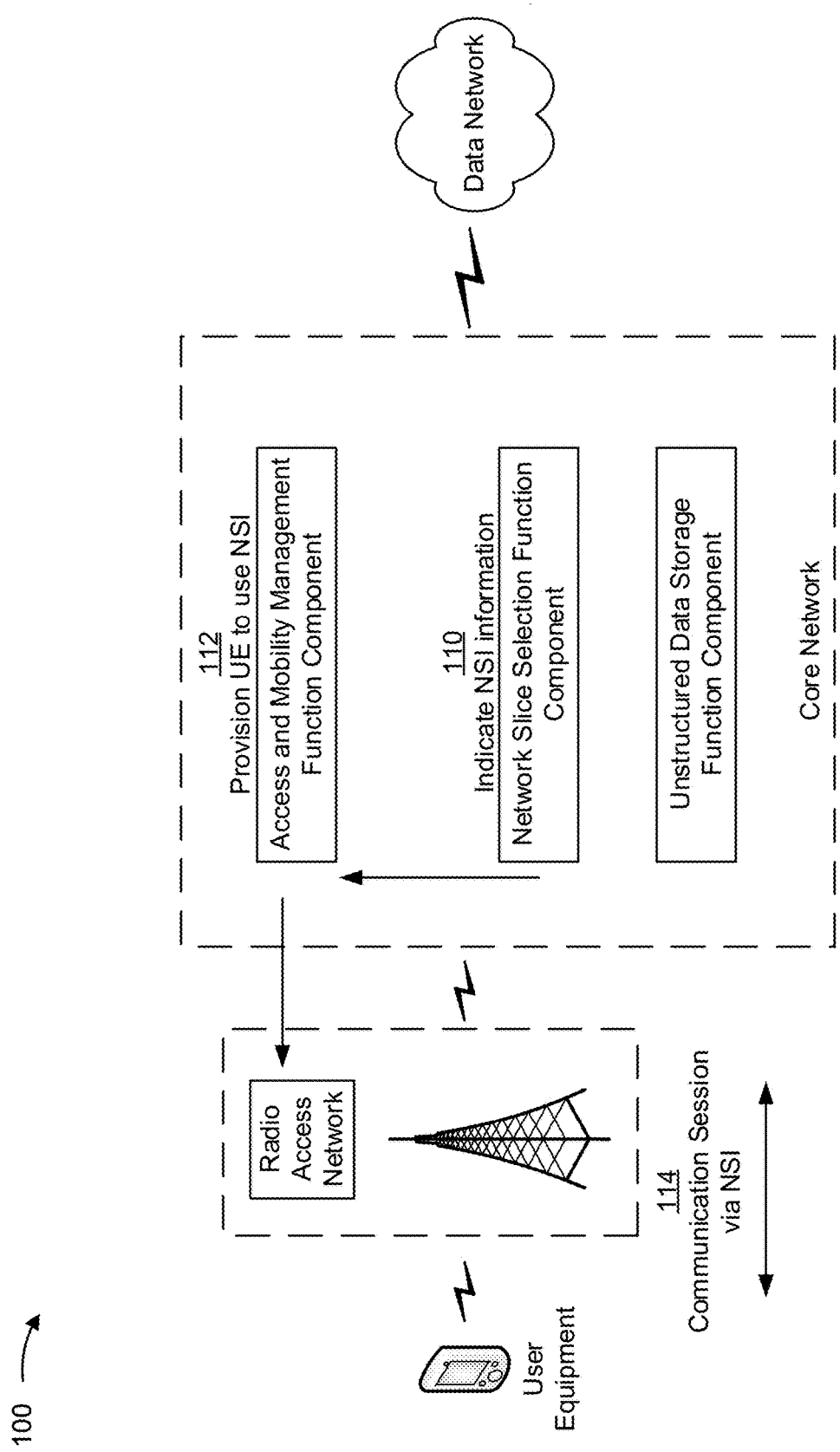

FIG. 1A-1C are diagrams of an example implementation 100 described herein. Example implementation 100 illustrates various portions of a wireless telecommunications system (referred to herein as a "wireless network"), which in some implementations can be a 5G wireless telecommunications system. Example implementation 100 can be a 5G wireless telecommunications system, a 4G wireless telecommunications system, a long-term evolution (LTE) wireless telecommunications system, a LTE-Advanced (LTE-A) wireless telecommunications system, and/or the like.

As shown in FIGS. 1A-1C, example implementation 100 can include a UE wirelessly connected to a radio access network (RAN) at a base station, which is connected to a data network via a core network. The UE can run an application that involves communicating with the data network, and therefore the UE can enter into a communication session (e.g., a PDU session) with the data network via the RAN and core network. The UE and the core network can communicate application-specific data during the communication session. In some implementations, to permit the UE to enter into the communication session with the data network, the UE can send an initial request to register with the core network.

The UE of example implementation 100 can be a communication and/or computing device, such as a mobile phone, a smartphone, a laptop computer, a tablet computer, an Internet of Things device, and/or the like. The base station of example implementation 100 can include an access point of a RAN, such as a 5G next generation NodeB (gNodeB or gNB), a LTE evolved NodeB (eNodeB or eNB), and/or the like. In some implementations, the base station facilitates a communication session by communicating application-specific data between the UE and the core network.

The core network of example implementation 100 can include various types of telecommunications core networks, such as a 5G next generation core network (NG Core), an LTE evolved packet core (EPC), and/or the like. As shown in FIGS. 1A-1C, the core network, among other components and/or functions, can include an access and mobility management function (AMF) component, a network slice selection function (NSSF) component, and an unstructured data storage function (UDSF) component of the core network). In some implementations, the AMF, the NSSF, the UDSF and/or other components or functions, cannot be co-located or are not co-located (e.g., each component and/or function of the core network can be at a different location from each other component and/or function of the core network).

The AMF of example implementation 100 can provide authentication and/or authorization of the UE. In some implementations, an authentication server function (AUSF) component assists the AMF in authenticating and/or authorizing the UE. Additionally, or alternatively, the AMF can coordinate with a unified data management (UDM) component to obtain subscribed NSSAI associated with the UE. The subscribed NSSAI can include a list of S-NSSAIs that the UE is subscribed to utilize (e.g., for a communication session). In some implementations, the UE may provide a particular number of S-NSSAIs (e.g., eight S-NSSAIs or more, fifteen S-NSSAIs or more, and/or the like), within the NSSAI, when sending a UE configuration request. Therefore, the UE can provide the NSSAI to the AMF so that the UE can be associated with (e.g., registered to, assigned to, and/or the like) an NSI, which can be considered a virtual network that is implemented through various physical resources of the RAN and/or network functions (NFs) of the core network. As described herein, the NSSF can provide an NSI for a S-NSSAIs included in the NSSAI from the UE. For example, the NSSF can maintain a mapping of S-NSSAIs to NSIs in the UDSF. In some implementations, the UDSF may be part of the NSSF and/or co-located with the NSSF. Accordingly, the NSSF can indicate an NSI selection and/or mapping of S-NSSAIs to NSIs to the AMF to permit the UE to utilize a corresponding NSI (and/or resources of the NSI) for a communication session.

In some implementations, the NSSF can determine a set of network slice policies to be considered when selecting an NSI. The set of network policies can set rules and/or requirements at a network level (e.g., for all or a subset of UEs, for all or specific applications, for all or specific geographic areas, and/or the like) and/or a user level (e.g., per UE, per application, and/or the like). The set of network slice policies, which can be maintained by a policy control function (PCF) component of the core network, can include an area capacity policy (e.g., a data rate capacity over an area), a mobility policy (e.g., location and speeds of UEs), a density policy (e.g., a number of communications sessions over an area), a guaranteed minimum data rate policy (e.g., minimum download and upload speeds), a maximum bitrate policy (e.g., maximum download and upload bitrates), a relative priority policy (e.g., relative importance of the application and/or UE compared to other applications and/or UEs), an absolute priority policy (e.g., objective importance of the application and/or UE compared to other applications and/or UEs), a latency rate policy (e.g., an end-to-end communications transmission time), a reliability policy (e.g., a communications transmission success rate), a resource scaling policy (e.g., an ability or range for scaling resources up or down), and/or the like. In some implementations, the set of network slice policies can define a low latency performance requirement (e.g., an end-to-end communications transmission time less than or equal to a threshold, such as 10 ms), a high latency performance requirement (e.g., an end-to-end communications transmission time greater than a threshold, such as 10 ms), a low reliability performance requirement (e.g., a communications transmission success rate less than a threshold, such as 99.99%), a high reliability performance requirement (e.g., a communications transmission success rate greater than or equal to a threshold, such as 99.99%), a high data rate performance requirement (e.g., download and upload speeds above a threshold, such as 50 Mbps), a low data rate performance requirement (e.g., download and upload speeds less than or equal to a threshold, such as 50 Mbps), a high traffic density requirement (e.g., greater than or equal to a threshold number of user devices per geographical area, such as 10,000 user devices per square kilometer), and/or a low traffic density requirement (e.g., less than a threshold number of user devices per geographical area, such as 10,000 user devices per square kilometer). In some implementations, the set of network slice policies can define a category for a service of a communication session.

The data network of example implementation 100 can include various types of data networks, such as the Internet, a third-party services network, an operator services network, a private network, a wide area network, and/or the like.

As shown in FIG. 1A, and by reference number 102, the UE can send a UE configuration request (e.g., a UE configuration message) (referred to herein as "the request") to the base station of the RAN to register the UE with the network and/or initiate a communication session between the UE and the data network. As shown in FIG. 1A, the request can include an S-NSSAI. The S-NSSAI can be one of a plurality of S-NSSAIs in an NSSAI of the request. In some implementations, the request can identify the data network (e.g., via a data network identifier) that is to be involved in a communication session with the UE. According to some implementations, to send the request, the UE can run an application (e.g., a configuration application) that causes the UE to communicate with the AMF of the core network, via the RAN, to request that an S-NSSAI associated with the UE be associated with an NSI to permit the UE to engage in a communication session with the data network.

In example implementation 100, the S-NSSAI can include service-based information elements that permit the core network (e.g., the NSSF) to select and/or associate the S-NSSAI with an NSI for the UE. Accordingly, the UE can utilize the NSI (as indicated by the NSSF and/or AMF, as described herein) for a communication session associated with the S-NSSAI.

As shown in example implementation 100, the S-NSSAI of the request can include an SST field, a network slice type (NEST) field, a service field, an entity association field, and an inter-slice priority level (ISPL) field. In some implementations, the NEST, the service, the entity association, and the ISPL are included within a slice differentiator (SD) field of the S-NSSAI. According to some implementations, the S-NSSAI can be configured such that fields of the S-NSSAI are maintained and/or identifiable by the UE, the RAN, the core network, and/or the like. For example, the S-NSSAI can have a length of 32 bits, with 8 bits being allocated for the SST and 24 bits being allocated for the SD, and each information element of the SD can include a certain number of bits and/or be included within the SD in a particular order or at particular locations of the S-NSSAI. As described above, the SST can identify a service/slice type (e.g., eMBB, URLLC, MIoT, and/or the like) for a communication session involving the UE.

The NEST field of the S-NSSAI can include a NEST identifier that identifies a type of NSI that is capable of supporting one or more applications and/or services involved in a communication session that uses the S-NSSAI to enable the UE to engage in the communication session. For example, the NEST can describe or identify a set of characteristics that the NSI is to have to support a communication session associated with the S-NSSAI. In some implementations, such characteristics can include a range of traffic quality of service (QoS) attributes (e.g., latency greater than a threshold number of milliseconds), resources and/or NFs associated with the communication session, resource scaling policies, a set of corresponding network configurations, and/or the like. In some implementations, the NEST field can include a NEST mapping for a particular SST. In other words, each SST can have a unique mapping of NESTs. In some implementations, the NEST field can be allocated four bits of the SD.

The service field can include a service identifier that identifies one or more services that can be involved in the communication session. For example, such services can include enhanced mobile broadband (e.g., for providing enhanced broadband access in dense areas, ultra-high bandwidth access in dense areas, broadband access in public transport systems, and/or the like), connected vehicles (e.g., for providing vehicle-to-everything (V2X) communications, such as vehicle-to-vehicle (V2V) communications, vehicle-to-infrastructure (V2I) communications, vehicle-to-network (V2N) communications, and vehicle-to-pedestrian (V2P) communications, and/or the like), real-time service (e.g., for providing inter-enterprise communications, intra-enterprise communications, maps for navigation, and/or the like), enhanced multi-media (e.g., for providing broadcast services, on demand and live TV, mobile TV, augmented reality (AR), virtual reality (VR), internet protocol (IP) multi-media subsystem (IMS) service, and/or the like), internet of things (IoT) (e.g., for providing metering, lighting management in buildings and cities, environmental monitoring, traffic control, and/or the like), URLLC (e.g., for providing process automation, automated factories, tactile interaction, emergency communications, urgent healthcare, and/or the like), mission critical push-to-talk (PTT), a fixed wireless access category (e.g., for providing localized network access and/or the like), and/or the like. In some implementations, a service type can be mapped to a same NEST. For example, IMS and Internet can both be mapped to an eMBB NEST. In some implementations, the service field can be allocated seven bits of the SD.

The entity association field can include an entity identifier that identifies one or more entities that are associated with the service provided in the communication session. For example, the one or more entities can include one or more application service providers capable of communicating with an end user associated with the UE to provide the one or more services to the end user via a communication session associated with the S-NSSAI. In some implementations, the one or more entities can be configured to monitor (e.g., via the communication session) the services at a slice level. Accordingly, different entities can be associated with different policies (e.g., according to SLAs of the entities) that permit monitoring of the services at the slice level. In some implementations, an entity can be associated with and/or allocated an isolated network for services and/or operations of the entity (e.g., according to an SLA of the entity). In this way, entity-specific information can be included in an S-NSSAI to permit one or more policies associated with the entity to be followed for a communication session associated with the S-NSSAI. Accordingly, an entity can be assigned and/or be associated with specific S-NSSAIs that can be configured to be associated with specific NSIs, as described herein. In some implementations, the entity association field can be allocated ten bits of the SD.

The ISPL field can include a priority identifier that identifies a priority level of an NSI that is to be selected for the S-NSSAI to ensure that a priority, among network slices of the network, is given to a communication session associated with the S-NSSAI. As described herein, traffic and services in one NSI should not impact traffic and services of another NSI. However, if resources are limited, the ISPL can indicate which S-NSSAIs are to be prioritized over other S-NSSAIs. Contrary to previous techniques, which do not consider an inter-slice priority for an S-NSSAI received from a UE, some implementations described herein can select an NSI for an S-NSSAI based on the ISPL identified in the SD of the S-NSSAI. In this way, a communication session, when carried via an NSI and associated with the S-NSSAI, can be given priority over other communication sessions that are using other NSIs according to other S-NSSAIs that did not include such a priority (and vice versa). In some implementations, the ISPL field can be allocated four bits of the SD.

Additionally, or alternatively, an ISPL may be allocated or assigned to S-NSSAIs that do not include an SD. For example, an NSSF may use a mapping of ISPLs for various SSTs of the S-NSSAIs. In this way, the NSSF may be configured to determine an inter-slice priority for S-NSSAIs associated with corresponding SSTs.

In this way, the UE can send an S-NSSAI (e.g., in a UE configuration request message) that includes information elements that permit the NSSF to make a service-based selection of an NSI.

As further shown in FIG. 1A, and by reference number 104, the RAN (e.g., via the base station) can receive the request and perform an AMF selection process to identify the AMF of the core network that is to be used to set up a communication session (e.g., via an NSI) for the UE and/or register the UE with the network, as described herein. In some implementations, the RAN can detect an identifier associated with the UE (e.g., an identifier that is mapped to an AMF, a temporary identifier if the UE is not registered with the UE, and/or the like) that can be used to identify and/or select the AMF of the core network.

In some implementations, the AMF can be selected based on the S-NSSAI and/or an NSSAI associated with the S-NSSAI. For example, the RAN can identify an SST of the S-NSSAIs in an NSSAI and select the AMF for the UE configuration according to a service/slice type of the S-NSSAIs. In this way, the RAN can forward the request and/or information in the request (e.g., an NSSAI, including the S-NSSAI of FIG. 1A) to the AMF to permit the AMF to instruct the NSSF to identify an NSI for the S-NSSAI based on the information elements of the S-NSSAI.

As further shown in FIG. 1A, and by reference number 106, the AMF performs an authentication process and/or authorization process associated with the UE. For example, the AMF can perform the authentication process to authenticate the request and/or verify that the request was received from the UE identified in the request. Furthermore, the AMF can perform the authorization process to authorize the UE to register and/or communicate as part of the wireless network based on the S-NSSAI and/or one or more other characteristics of the UE.

In some implementations, the AMF can utilize a lookup table to determine whether to authenticate and/or authorize the UE. For example, the AMF can compare the information that identifies the UE with information accessible to the AMF that identifies devices that are authorized to connect with the wireless network (e.g., devices that subscribe to a wireless network provider that maintains the wireless network, devices that are capable of communicating with a type of the wireless network, and/or the like). Once the AMF authenticates and/or authorizes the UE, the AMF can authorize the NSSF to determine an NSI for the S-NSSAI as described herein.

In this way, the AMF can determine whether the UE is a valid device that is capable of communicating over the wireless network and/or whether the UE has permission to connect with the data network (or RAN or core network).

As further shown in FIG. 1A, and by reference number 108, the NSSF determines service-based network slice allocation for the S-NSSAI as described herein. In some implementations, the NSSF determines an NSI and/or assigns the S-NSSAI to an NSI to allocate an NSI (e.g., along with corresponding resources or NFs of the NSI) to the S-NSSAI. For example, the NSSF can identify the information elements of the S-NSSAI to determine one or more characteristics of a communication session associated with the S-NSSAI and select an NSI that can facilitate such a communication session.

In some implementations, the NSSF can maintain one or more mappings (e.g., run-time tables) of S-NSSAIs associated with the wireless network. The one or more mappings can be maintained in the UDSF of the core network. Such S-NSSAIs could have been issued to one or more other UEs, could have been established by entities associated with the S-NSSAIs (e.g., when the entities entered into SLAs associated with the wireless network), and/or could have been previously provisioned by the wireless network to provide corresponding services associated with the S-NSSAIs. In some implementations, the NSSF can maintain an RSC mapping that identifies RSCs of corresponding S-NSSAIs. In some implementations, the RSC mapping can include mappings of full S-NSSAIs or partial S-NSSAIs. For example, the NSSF can use a longest match analysis of a received S-NSSAI as compared to one or more of the S-NSSAIs in the RSC mapping. In this way, the RSC mapping can determine that a partial match of an S-NSSAI to an S-NSSAI in the RSC mapping (e.g., a match of the SST and/or NEST) can be considered as a match or mapping for the received S-NSSAI. In some implementations, resource layers can be shared across S-NSSAIs with different SSTs and/or S-NSSAIs with different NESTs. Additionally, or alternatively, the NSSF can maintain one or more mappings of NSIs to the RSCs, NESTs, SSTs, and/or S-NSSAIs.

Accordingly, as described herein, when the NSSF receives an S-NSSAI, the NSSF can determine whether an RSC is associated with the S-NSSAI (e.g., from a mapping of S-NSSAIs to RSCs). Additionally, or alternatively, as described herein, the NSSF can determine whether the S-NSSAI is associated with an NSI (e.g., from a mapping of RSCs and/or S-NSSAIs to NSIs). As described herein, the NSSF can utilize the one or more mappings to associate a received S-NSSAI with an NSI and/or identify an NSI that is to be used by a UE during a communication session associated with the S-NSSAI.

In FIG. 1B, the NSSF determines whether the S-NSSAI is to be associated with an RSC and/or an NSI using one or more mappings stored in association with the UDSF and/or maintained by the UDSF. As shown in example implementation 100, the UDSF includes an RSC table and one or more NSI runt-time tables. Each of the NSI run-time tables can be associated with a particular SST. Therefore, as an example, a separate NSI run-time table (and thus separate values and/or variables) can be maintained for an eMBB service of example implementation 100 versus an NSI run-time table maintained for a URLLC service of the wireless network of example implementation 100. In some implementations, one or more processes illustrated in FIG. 1B can be performed in connection with the NSSF determining a service-based network slice allocation for an S-NSSAI, as described herein.

As shown in FIG. 1B, and by reference number 108a, the NSSF determines whether the S-NSSAI is associated with an RSC by determining whether the S-NSSAI is in an RSC table associated with the wireless network. The RSC table can indicate resource layers that UEs associated with an S-NSSAI can be configured to share with other UEs associated with other S-NSSAIs. As used herein, a "first S-NSSAI sharing resources with a second S-NSSAI" implies that UEs associated with the first S-NSSAI are sharing resources with UEs associated with the second S-NSSAI.

As shown in FIG. 1B, an RSC, which can be identified by an RSC identifier (shown in the RSC table as RSC #), can include resource layers. For example, as shown, the RSCs of the RSC table can include four resource layers (shown as RL-1 to RL-4). Each cell of the RSC table in FIG. 1B identifies S-NSSAIs and whether the S-NSSAIs are to share the resources of the respective resource layer with other S-NSSAIs. Accordingly, each row of the RSC table identifies which S-NSSAIs are associated with the RSC (e.g., RSC 0, RSC 1, RSC 2, RSC 3) of that row and which S-NSSAIs of that RSC are to share resources of corresponding resource layers of the RSC with other S-NSSAIs. In some implementations, for a given RSC, one resource layer can be shared by all S-NSSAIs associated with that RSC (e.g., assigned to have that RSC), or the resource layer can be dedicated to a single S-NSSAI.

In some implementations, an S-NSSAI is associated with only one RSC. In some implementations, an RSC (e.g., RSC 0 of the RSC table) can be a default RSC. Additionally, or alternatively, a default value (e.g., 0) for a particular cell of the RSC can be used to represent that resources of those resource layers, for that RSC, are to be shared by any or all S-NSSAIs in that cell. In some implementations, the S-NSSAIs of the RSC table may be associated with any/all S-NSSAIs associated with a same NEST. A default RSC can indicate that all resource layers of the RSC are to be shared by any or all S-NSSAIs that utilize the default RSC.

As an example, S-NSSAIs p, x, y, z are associated with RSC 1. In example implementation 100, for RSC 1, S-NSSAIs x, y, z can be configured to share resources of RL-3 (as shown by "{x, y, z}") and resources of RL-3 are to be dedicated to S-NSSAI p. Therefore, as described herein, a first NSI can be used for UEs associated with S-NSSAIs x, y, z to engage in a communication session and a second NSI, separate from the first NSI, can be used for UEs associated with S-NSSAI p.

In some implementations, each of the resource layers can correspond to one or more NSSIs. For example, a sample NSSI stack can include resource layers corresponding to a core network NSSI (CN NSSI), a transport network NSSI (TN NSSI), an access node central unit NSSI (RAN CU NSSI), an access node distributed unit NSSI (RAN DU NSSI), a radio resource NSSI, and a carrier NSSI. In such a case, resources and/or functions of the CN NSSI can be included in a first resource layer of the RSC, resources and/or functions of the TN NSSI can be included in a second resource layer of the RSC, and so on. Additionally, or alternatively, one or more of the above NSSIs can be considered to be within a same resource layer of an RSC. For example, resources and/or functions of CN NSSI and TN NSSI can be in a first resource layer of an RSC and/or resources and/or functions of a radio resource NSSI and carrier NSSI can be in a second resource layer of the RSC. Therefore, the resource layers can be divided into one or more of carrier/band, radio frequency resources, access node (AN) resources, TN resources, CN resources, and/or the like. In some implementations, each of these resources layers can be further divided into more resource layers (e.g., for RL-specific scaling).

According to some implementations, if the received S-NSSAI is not in the RSC table (i.e., if the S-NSSAI is not one of S-NSSAIs a, m, n, p, x, y, or z), the NSSF can assign and/or determine that the S-NSSAI is associated with a default RSC (e.g., RSC 0). On the other hand, if the received S-NSSAI is in the RSC table (i.e., if the S-NSSAI is one of S-NSSAIs a, m, n, p, x, y, or z), the NSSF can determine the RSC associated with the S-NSSAI and whether or not the S-NSSAI is configured to share resources of any resource layers of the RSC.

In this way, the NSSF can identify an RSC associated with an S-NSSAI, to permit the RSC associated with the S-NSSAI to be associated with an NSI to permit the UE to use the NSI during a communication session with the data network. In other words, the NSSF can determine whether services of the S-NSSAI indicate whether the UE is to use an NSI that allows for sharing of resources (e.g., of particular resource layers of an RSC) with UEs of other S-NSSAIs and/or whether the UE is to use an NSI that allows for dedication of resources (e.g., of particular resources layers of an RSC) to UEs associated with that S-NSSAI.

As further shown in FIG. 1B, and by reference number 108b, the NSSF determines whether the S-NSSAI is associated with an NSI by determining whether the RSC associated with the S-NSSAI is in one of the NSI run-time tables. In some implementations, the NSI run-time table can be a microservice instantiated by the NSSF (or by an NSSF cloud-network function (CNF)). According to some implementations, the NSSF can identify an SST of the S-NSSAI, identify the NSI table for that SST, and determine whether the identified RSC, associated with the S-NSSAI and from the RSC table, is in that NSI run-time table.

In some implementations, the NSSF can build the NSI run-time table according to the S-NSSAIs in the RSC table. For example, the NSSF can identify whether there are any S-NSSAIs that are configured to have dedicated resources of one or more of the resource layers of an RSC. More specifically, because two sets of S-NSSAIs (i.e., {x, y, z} and {p}) are associated with RSC 1 in example implementation 100, the NSSF can determine that two separate NSIs are to be defined for each set. In this way, the resources of the respective NSIs for the RL-3 and RL-4 can be separate from one another (e.g., mutually exclusive). Furthermore, two separate NSIs can be formed for RSC 3 (e.g., one NSI for S-NSSAI m and another NSI for S-NSSAI n) because the two NSIs are to have a dedicated RL-4. As another example, RSC 2 can use a single for S-NSSAI j with all resource layers being dedicated to S-NSSAI j. Finally, the default RSC is associated with all other S-NSSAIs or all other S-NSSAIs associated with a same NEST.

According to some implementations, if the RSC is not in the NSI run-time table (i.e., if the RSC is not one of RSC 0, RSC 1, or RSC 3), the NSSF can form a new NSI (and/or cause a new NSI to be formed). For example, the NSSF can communicate with one or more components of the core network (e.g., a network function virtualization orchestration (NFVO) component) to create a new NSI. In such cases, a unique NSI identifier can be assigned to the new NSI and the S-NSSAI can be mapped to the new NSI in the NSI run-time table. More specifically, if S-NSSAI j is received from the UE in example implementation 100, and RSC 2 from the RSC table, the NSSF can cause a new NSI to be created with NSI ID 23 (not shown), and S-NSSAI j can be assigned to use the NSI (e.g., via the NSI run-time table). Additionally, or alternatively, if the RSC is not in the run-time table, the NSSF may determine that the S-NSSAI is to be associated with a default NSI (e.g., a default NSI according to the NEST). Accordingly, the NSSF may map the S-NSSAI to the default NSI using the UDSF, as described herein.

On the other hand, if the RSC is in the table, the NSSF can select the NSI for the S-NSSAI by finding the S-NSSAI in the NSI run-time table. For example, if S-NSSAI y is received from the UE in example implementation 100, the NSSF can map the S-NSSAI to the NSI identified by NSI ID 2.

As mentioned above, the default RSC may be a default RSC for all S-NSSAIs, other than those specified in the RSC table, associated with the wireless network. In some implementations, the SST and/or NEST is identified when the RSC associated with the S-NSSAI is determined to be the default RSC (e.g., RSC 0). For example, because the NEST can be unique within an SST and defines the type of an NSI for a communication session associated with the S-NSSAI, the NSSF can identify whether an NSI for the NEST exists when the RSC is the default RSC. Accordingly, although the RSC can be a default value, one or more unique NESTs can be used to determine whether an NSI is associated with the received S-NSSAI.

In some implementations, based on services associated with an S-NSSAI (e.g., as identified in the SST and/or SD of the S-NSSAI), the NSSF can associate the S-NSSAI to an NSI to permit a UE to engage in a communication session, via the NSI, according to the S-NSSAI associated with the UE. In this way, the NSSF can select an NSI that is available and/or able to meet the characteristics of a service associated with the communication session, to permit the UE to receive the service.

As shown in FIG. 1C, and by reference 110, the NSSF indicates NSI information. For example, the NSSF can indicate the selected NSI to the AMF. As described herein, the NSSF can provide an identifier, from the NSI run-time table, for an NSI that is associated with the S-NSSAI. Additionally, or alternatively, the NSSF my indicate that the S-NSSAI has been associated with the NSI and the AMF can use the NSI run-time table to perform one or more operations associated with the indicated NSI, as described herein. In this way, the NSSF can indicate, to the AMF, that the S-NSSAI has been associated with an NSI.

In some implementations, if the RSC is not in the NSI run-table and/or if the S-NSSAI is not in the NSI run-time table as described above in connection with FIG. 1B, the NSSF can indicate that the S-NSSAI is not supported and/or not allowed for use by the UE. Accordingly, the NSSF (and/or AMF) can deny the UE the capability to engage in a communication session using the S-NSSAI.

In some implementations, the NSSF may override the S-NSSAI. For example, based on a type of traffic of a communication session (e.g., a PDU session) associated with the UE, the core network (e.g., via the NSSF and/or the AMF) may override the received S-NSSAI and assign an NSSAI to the UE for the communication session. One or more S-NSSAIs of the NSSAI may then be used for the communication session.

As further shown in FIG. 1C, and by reference number 112, the AMF can provision the UE to use the NSI. For example, the AMF can provision the UE to use the NSI in order to register the UE as part of the wireless network and/or enable the UE to engage in a communication session with the data network via the NSI. In some implementations, the AMF, when receiving and/or sending messages (e.g., PDUs) from and/or to the UE, can use the physical resources associated with the NSI to permit the messages to be received or sent.

As further shown in FIG. 1C, and by reference number 114, the UE can engage in the communication session via the NSI.

In this way, some implementations described herein permit an NSSF to select an NSI for an S-NSSAI, provided by a UE, to permit the UE to enter into a communication session with a data network associated with the NSSF. The NSSF can select the NSI based on a service and/or a characteristic of the UE, as defined by the S-NSSAI (e.g., in an SD field), and RSCs associated with one or more NSIs of the network. Accordingly, some implementations described herein permit an NSSF, of a core network, to associate an S-NSSAI with an NSI that includes network functions capable of providing a service of the S-NSSAI. Therefore, the NSSF can permit the UE to engage in a communication session with the data network, using the S-NSSAI, to offer the services needed by the UE, and allow for efficient allocation of resources.

As indicated above, FIGS. 1A-1C are provided merely as an example. Other examples can differ from what is described with regard to FIGS. 1A-1C.

Figure 2:
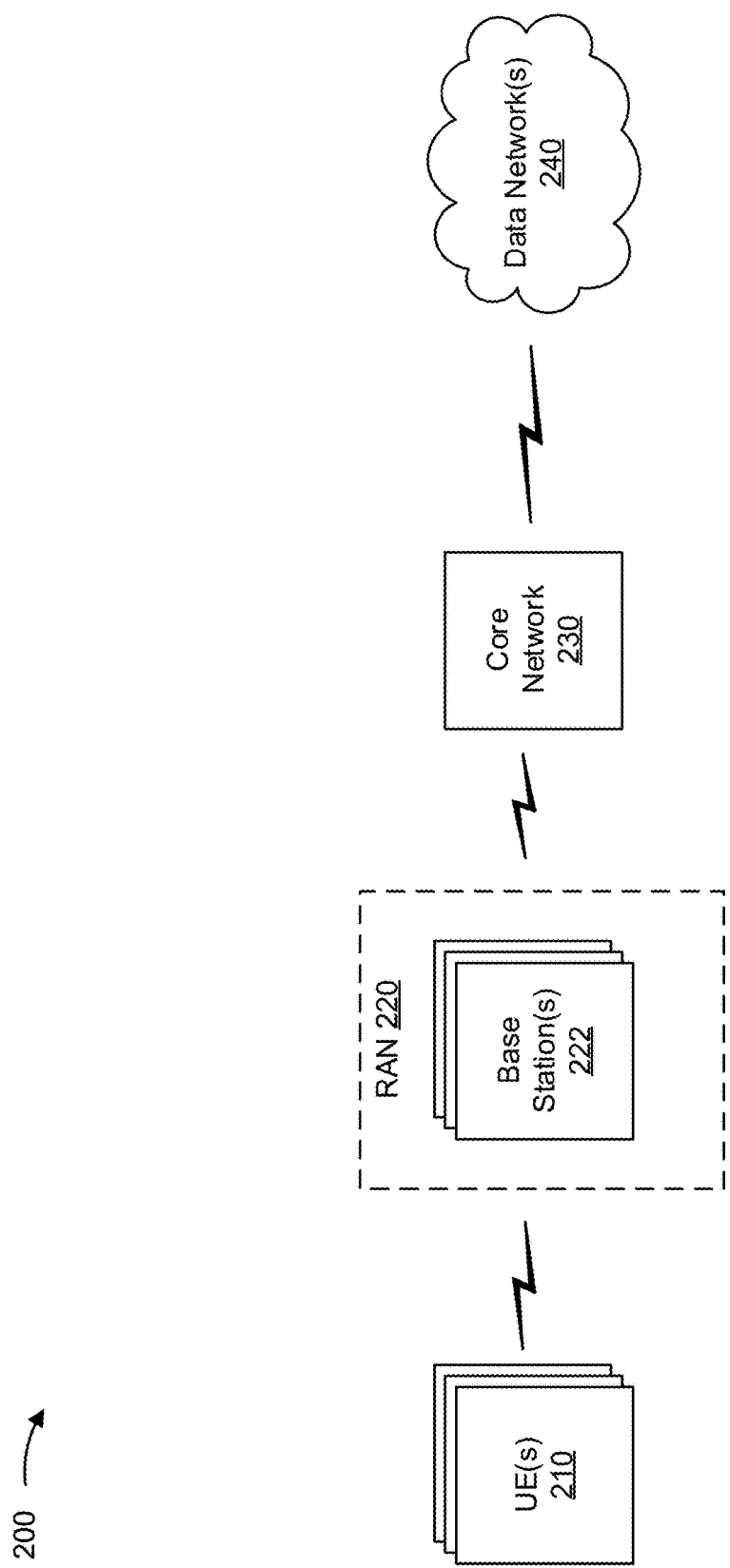
FIG. 2 is a diagram of an example environment in which systems, functional architectures, and/or methods described herein can be implemented.

FIG. 2 is a diagram of an example environment 200 in which systems and/or methods described herein can be implemented. As shown in FIG. 2, environment 200 can include a UE 210, an RAN 220, a base station 222, a core network 230, and a data network 240. Devices of environment 200 can interconnect via wired connections, wireless connections, or a combination of wired and wireless connections.

UE 210 can include one or more devices capable of communicating with base station 222 and/or a network (e.g., data network 240). For example, UE 210 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. UE 210 can be capable of communicating using uplink (e.g., UE to base station) communications, downlink (e.g., base station to UE) communications, and/or sidelink (e.g., UE-to-UE) communications. In some implementations, UE 210 can include a machine-type communication (MTC) UE, such as an evolved or enhanced MTC (eMTC) UE. In some implementations, UE 210 can include an Internet of Things (IoT) UE, such as a narrowband IoT (NB-IoT) UE and/or the like.

RAN 220 can include a base station and be operatively connected, via a wired and/or wireless connection, to the core network 230 through UPF 324. RAN 220 can facilitate communication sessions between UEs and data network 240 by communicating application-specific data between RAN 220 and core network 230. Data network 240 can include various types of data networks, such as the Internet, a third-party services network, an operator services network, a private network, a wide area network, and/or the like.

Base station 222 includes one or more devices capable of communicating with UE 210 using a cellular radio access technology (RAT). For example, base station 222 can include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 222 can transfer traffic between UE 210 (e.g., using a cellular RAT), other base stations 222 (e.g., using a wireless interface or a backhaul interface, such as a wired backhaul interface), and/or data network 240. Base station 222 can provide one or more cells that cover geographic areas. Some base stations 222 can be mobile base stations. Some base stations 222 can be capable of communicating using multiple RATs.

In some implementations, base station 222 can perform scheduling and/or resource management for UEs 210 covered by base station 222 (e.g., UEs 210 covered by a cell provided by base station 222). In some implementations, base stations 222 can be controlled or coordinated by a network controller, which can perform load balancing, network-level configuration, and/or the like. The network controller can communicate with base stations 222 via a wireless or wireline backhaul. In some implementations, base station 222 can include a network controller, a self-organizing network (SON) module or component, or a similar module or component. In other words, a base station 222 can perform network control, scheduling, and/or network management functions (e.g., for other base stations 222 and/or for uplink, downlink, and/or sidelink communications of UEs 210 covered by the base station 222). In some implementations, base station 222 can include a central unit and multiple distributed units. The central unit can coordinate access control and communication with regard to the multiple distributed units. The multiple distributed units can provide UEs 210 and/or other base stations 222 with access to data network 240.

Core network 230 can include various types of core network architectures, such as a 5G NG Core (e.g., core network 300 of FIG. 3), an LTE EPC, and/or the like. In some implementations, core network 230 can be implemented on physical devices, such as a gateway, a mobility management entity, and/or the like. In some implementations, the hardware and/or software implementing core network 230 can be virtualized (e.g., through the use of network function virtualization and/or software-defined networking), thereby allowing for the use of composable infrastructure when implementing core network 230. In this way, networking, storage, and compute resources can be allocated to implement the functions of core network 230 in a flexible manner as opposed to relying on dedicated hardware and software to implement these functions.

Data network 240 includes one or more wired and/or wireless data networks. For example, data network 240 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
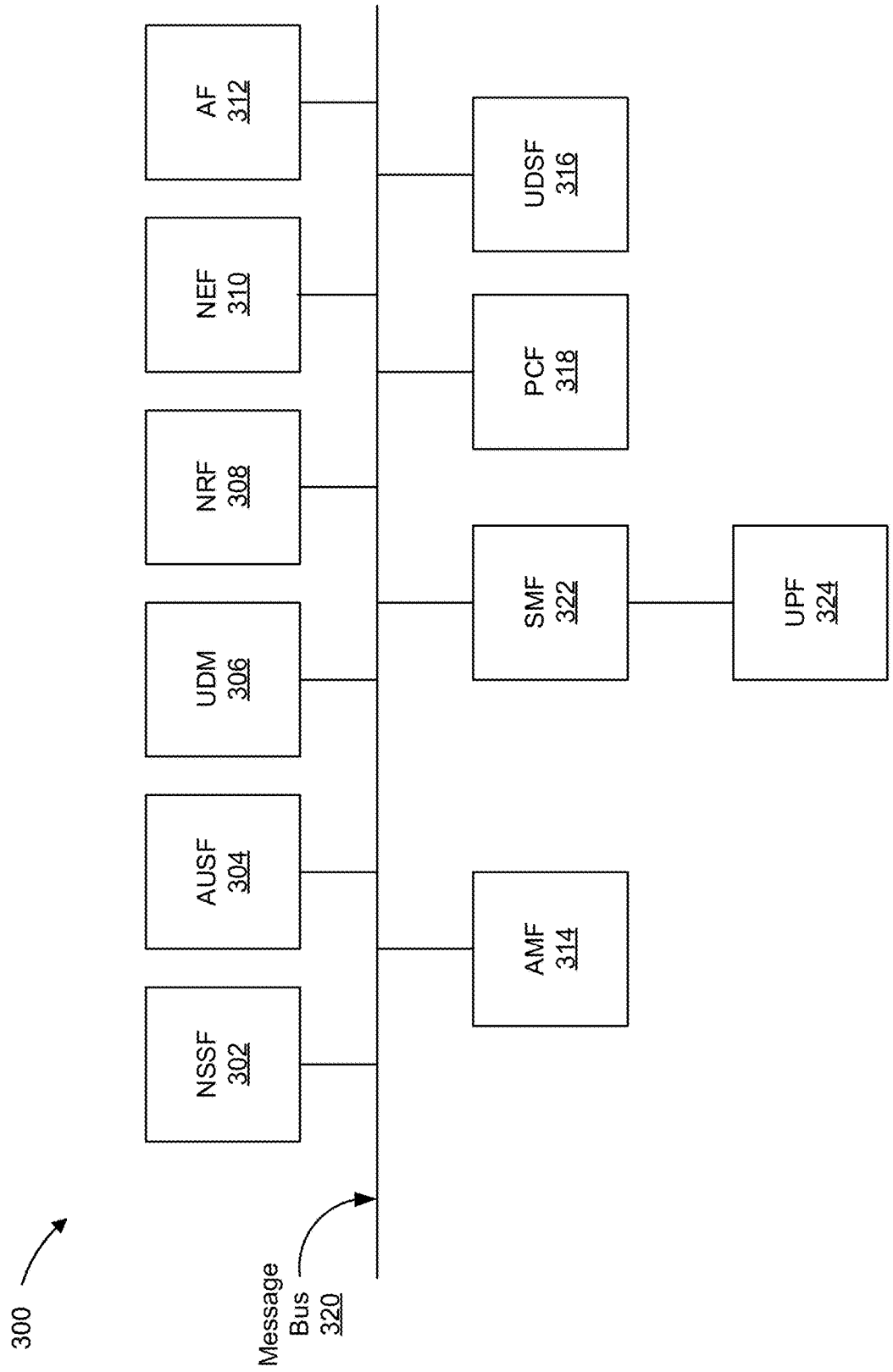
FIG. 3 is a diagram of an example functional architecture of an example core network described herein.

FIG. 3 is a diagram of an example functional architecture of a core network 300 in which systems and/or methods, described herein, can be implemented. For example, FIG. 3 can show an example functional architecture of a 5G NG core network included in a 5G wireless telecommunications system. In some implementations, the example functional architecture can be implemented by a core network (e.g., core network 230 of FIG. 2) and/or one or more devices (e.g., a device described with respect to FIG. 4). While the example functional architecture of core network 300 shown in FIG. 3 can be an example of a service-based architecture, in some implementations, core network 300 can be implemented as a reference-point architecture.

As shown in FIG. 3, core network 300 can include a number of functional elements. The functional elements can include, for example, an NSSF 302, an AUSF 304, a UDM 306, a Network Resource Function (NRF) 308, an NEF 310, an AF 312, an AMF 314, a UDSF 316, a PCF 318, a message bus 320, a Session Management Function (SMF) 322, and a UPF 324. These functional elements can be communicatively connected via a message bus 320, which can be comprised of one or more physical communication channels and/or one or more virtual communication channels. Each of the functional elements shown in FIG. 3 is implemented on one or more devices associated with a wireless telecommunications system. In some implementations, one or more of the functional elements can be implemented on physical devices, such as an access point, a base station, a gateway, a server, and/or the like. In some implementations, one or more of the functional elements can be implemented on one or more computing devices of a cloud computing environment associated with the wireless telecommunications system. In some implementations, the core network 300 can be operatively connected to an RAN 220, a data network 240, and/or the like, via wired and/or wireless connections with UPF 324.

NSSF 302 can select network slice instances for UEs, where NSSF 302 can determine a set of network slice policies to be applied at the RAN 220. By providing network slicing, NSSF 302 allows an operator to deploy multiple substantially independent end-to-end networks potentially with the same infrastructure. In some implementations, each slice can be customized for different services. NEF 310 can support the exposure of capabilities and/or events in the wireless telecommunications system to help other entities in the wireless telecommunications system discover network services and/or utilize network resources efficiently.

AUSF 304 can act as an authentication server and support the process of authenticating UEs in the wireless telecommunications system. UDM 306 can store subscriber data and profiles in the wireless telecommunications system. UDM 306 can be used for fixed access, mobile access, and/or the like, in core network 230. PCF 318 can provide a policy framework that incorporates network slicing, roaming, packet processing, mobility management, and/or the like.

AF 312 can determine whether UEs provide preferences for a set of network slice policies and support application influence on traffic routing, access to NEF 310, policy control, and/or the like. AMF 314 can provide authentication and authorization of UEs and mobility management. UDSF 316 includes one or more data structures configured to store information, mappings, and/or the like associated with the core network 300.

SMF 322 can support the establishment, modification, and release of communication sessions in the wireless telecommunications system. For example, SMF 322 can configure traffic steering policies at UPF 324, enforce UE IP address allocation and policies, and/or the like. AMF 314 and SMF 322 can act as a termination point for Non-Access Stratum (NAS) signaling, mobility management, and/or the like. SMF 322 can act as a termination point for session management related to NAS. RAN 220 can send information (e.g., the information that identifies the UE) to AMF 314 and/or SMF 322 via PCF 318.

UPF 324 can serve as an anchor point for intra/inter RAT mobility. UPF 324 can apply rules to packets, such as rules pertaining to packet routing, traffic reporting, handling user plane QoS, and/or the like. UPF 324 can determine an attribute of application-specific data that is communicated in a communication session. UPF 324 can receive information (e.g., information that identifies the communications attribute of the application) from RAN 220 via SMF 322 or an API. Message bus 320 represents a communication structure for communication among the functional elements. In other words, message bus 320 can permit communication between two or more functional elements. Message bus 320 can be a message bus, HTTP/2 proxy server, and/or the like.

The number and arrangement of functional elements shown in FIG. 3 are provided as an example. In practice, there can be additional functional elements, fewer functional elements, different functional elements, or differently arranged functional elements than those shown in FIG. 3. Furthermore, two or more functional elements shown in FIG. 3 can be implemented within a single device, or a single functional element shown in FIG. 3 can be implemented as multiple, distributed devices. Additionally, or alternatively, a set of functional elements (e.g., one or more functional elements) of core network 300 can perform one or more functions described as being performed by another set of functional elements of core network 300.

Figure 4:
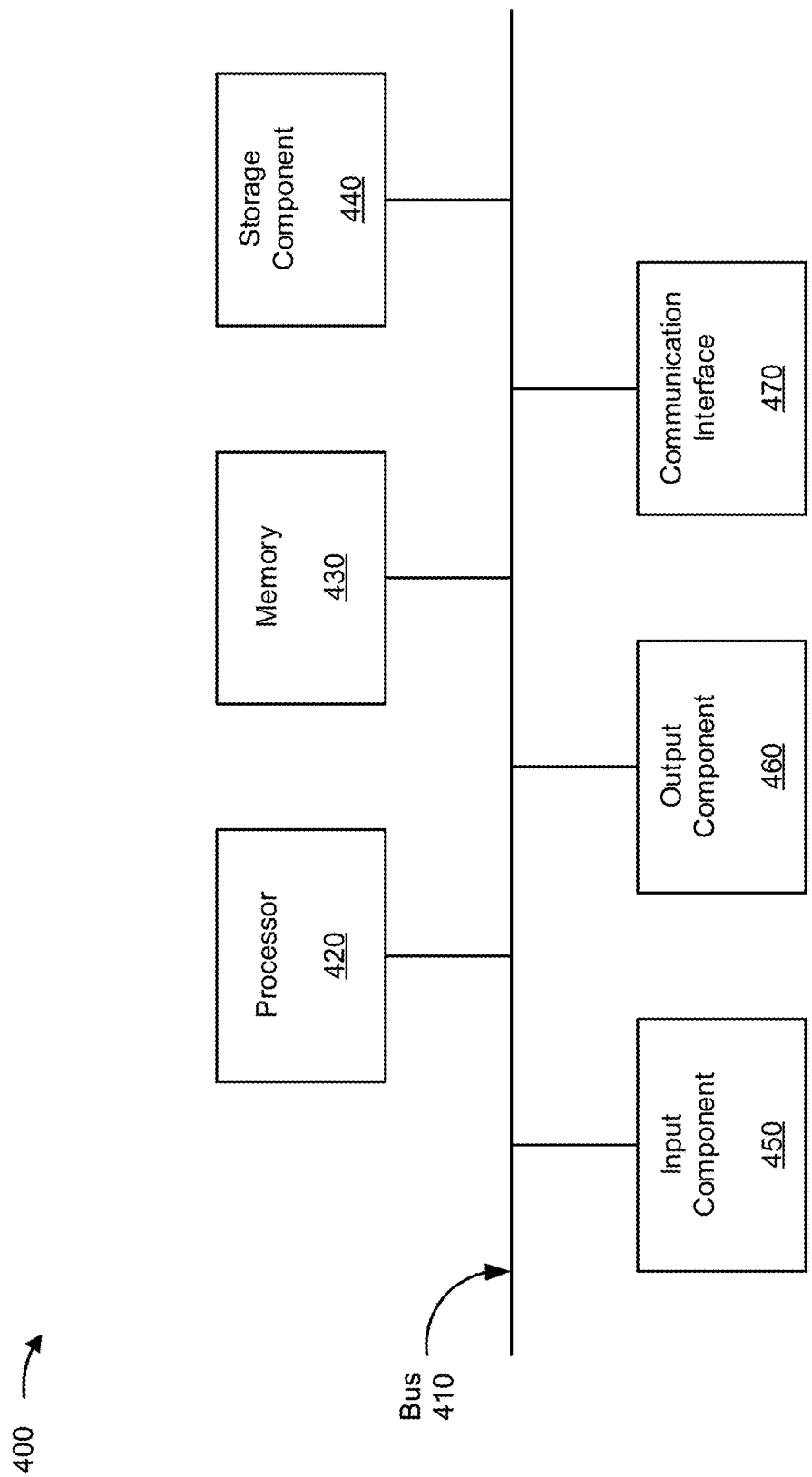
FIG. 4 is a diagram of example components of one or more devices of FIG. 2.

FIG. 4 is a diagram of example components of a device 400. Device 400 can correspond to UE 210, RAN 220, base station 222, and/or core network 230. In some implementations UE 210, RAN 220, base station 222, and/or core network 230 can include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a wireless local area network interface, a cellular network interface, or the like.

Device 400 can perform one or more processes described herein. Device 400 can perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

Figure 5:
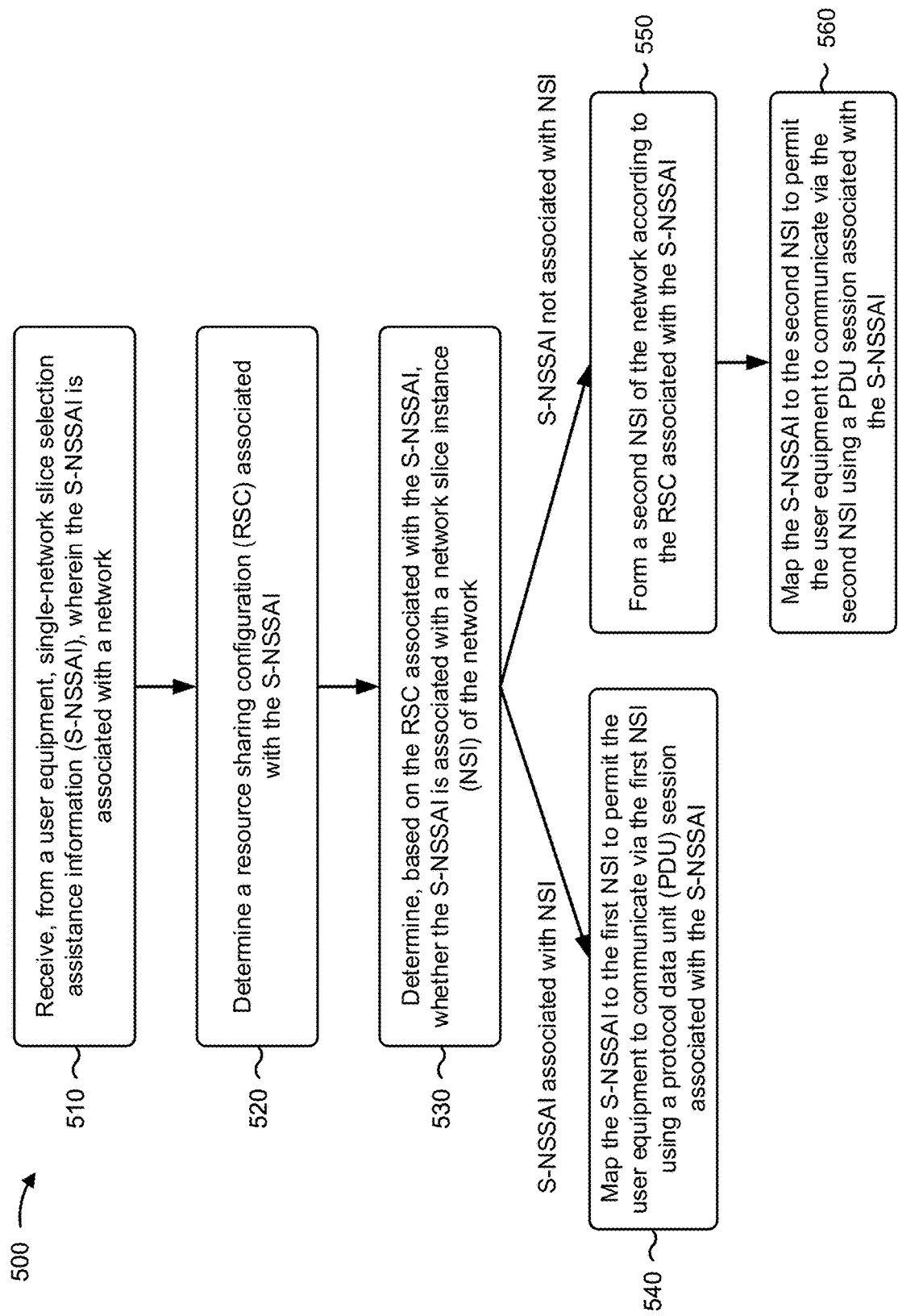
FIG. 5 is a flow chart of an example process for network slice selection based on a requested service.

FIG. 5 is a flow chart of an example process 500 for network slice selection based on a requested service. In some implementations, one or more process blocks of FIG. 5 can be performed by a component of a core network (e.g., core network 230), such as by an NSSF (e.g., NSSF 302). In some implementations, one or more process blocks of FIG. 5 can be performed by another device or a group of devices separate from or including an NSSF (e.g., NSSF 302), such as a UE (e.g., UE 210), an RAN (e.g., RAN 220), a base station (e.g., base station 222), or one or more other components of the core network (e.g., an AUSF (e.g., AUSF 304), a UDM (e.g., UDM 306), an NRF (e.g., NRF 308), an NEF (e.g., NEF 310), an AF (e.g., AF 312), an AMF (e.g., AMF 314), a UDSF (e.g., UDSF 316), a PCF (e.g., PCF 318), a message bus (e.g., message bus 320), an SMF (e.g., SMF 322), a UPF (e.g., UPF 324), and/or the like).

As shown in FIG. 5, process 500 can include receiving, from a UE, single-network slice selection assistance information (S-NSSAI), wherein the S-NSSAI is associated with a network (block 510). For example, the NSSF (e.g., using processor 420, memory 430, storage component 440, input component 450, communication interface 470, and/or the like) can receive, from a UE, single-network slice selection assistance information (S-NSSAI), as described above. In some implementations, the S-NSSAI is associated with a network.

As further shown in FIG. 5, process 500 can include determining a resource sharing configuration (RSC) associated with the S-NSSAI (block 520). For example, the NSSF (e.g., using processor 420, memory 430, storage component 440, input component 450, communication interface 470, and/or the like) can determine an RSC associated with the S-NSSAI, as described above.

As further shown in FIG. 5, process 500 can include determining, based on the RSC associated with the S-NSSAI, whether the S-NSSAI is associated with a network slice instance (NSI) of the network (block 530). For example, the NSSF (e.g., using processor 420, memory 430, storage component 440, input component 450, communication interface 470, and/or the like) can determine, based on the RSC associated with the S-NSSAI, whether the S-NSSAI is associated with an NSI of the network, as described above.

As further shown in FIG. 5, process 500 can include mapping the S-NSSAI to the first NSI to permit the UE to communicate via the first NSI using a protocol data unit (PDU) session associated with the S-NSSAI (block 540). For example, when the S-NSSAI is determined to be associated with a first NSI, the NSSF (e.g., using processor 420, memory 430, storage component 440, output component 460, communication interface 470, and/or the like) can map the S-NSSAI to the first NSI to permit the UE to communicate via the first NSI using a PDU session associated with the S-NSSAI, as described above.

As further shown in FIG. 5, process 500 can include forming a second NSI of the network according to the RSC associated with the S-NSSAI (block 550). For example, when the S-NSSAI is not determined to be associated with an NSI, the NSSF (e.g., using processor 420, memory 430, storage component 440, input component 450, communication interface 470, and/or the like) can form a second NSI of the network according to the RSC associated with the S-NSSAI, as described above.

As further shown in FIG. 5, process 500 can include mapping the S-NSSAI to the second NSI to permit the UE to communicate via the second NSI using a PDU session associated with the S-NSSAI (block 560). For example, the NSSF (e.g., using processor 420, memory 430, storage component 440, output component 460, communication interface 470, and/or the like) can map the S-NSSAI to the second NSI to permit the UE to communicate via the second NSI using a PDU session associated with the S-NSSAI, as described above.

Process 500 can include additional implementations, such as any single implementation or any combination of implementations described below and/or in connection with one or more other processes described elsewhere herein.

In some implementations, the S-NSSAI is received in at least one of a request from the user equipment to register the UE with the network or a request to initiate the PDU session. In some implementations, a slice differentiator field of the S-NSSAI identifies at least one of: a network slice type (NEST) that identifies one or more characteristics of the network that are to be supported by the NSI, a service of the network that is to be utilized by the UE, an entity associated with the UE, or an inter-slice priority level that identifies that an NSI that is mapped to the S-NSSAI has a priority relative to other NSIs of the network.

In some implementations, the RSC identifies a set of resource layers, of the network, that the UE can share according to the S-NSSAI.

In some implementations, the NSSF, when determining the RSC, can determine resource layers that can be shared with another UE associated with the S-NSSAI or another UE associated with another S-NSSAI. In some implementations, the RSC is determined based on the resource layers.

In some implementations, the NSSF, when determining the RSC, can determine that the S-NSSAI is not associated with a specific RSC, can determine, based on the S-NSSAI not being associated with a specific RSC, that the S-NSSAI is associated with a default RSC, and can determine that the RSC is the default RSC. In some implementations, the NSSF, when determining whether the S-NSSAI is associated with an NSI, can determine, based on the RSC being the default RSC, whether the S-NSSAI is associated with an NSI of the network based on at least one of: a network service type (NEST) of the S-NSSAI or a service/slice type (SST) of the S-NSSAI. In some implementations, the NSSF can provision the PDU session, associated with the user equipment, to utilize the first NSI or the second NSI. In some implementations, the NSSF can determine a traffic type of the PDU session, override, based on the determined traffic type of the PDU session, the S-NSSAI by assigning an NSSAI to the user equipment, and provision the PDU session according to the assigned NSSAI.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

The foregoing disclosure provides illustration and description but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device and from a user equipment, single-network slice selection assistance information (S-NSSAI),
        wherein the S-NSSAI is associated with a network;
    determining, by the device, a resource sharing configuration (RSC) associated with the S-NSSAI;
    identifying, by the device, a slice/service type (SST) of the S-NSSAI;
    identifying, by the device and based on identifying the SST, a network slice instance (NSI) table associated with the SST;
    determining, by the device, whether the RSC associated with the S-NSSAI is included in the NSI table;
    determining, by the device and based on determining that the RSC associated with the S-NSSAI is included in the NSI table, whether the S-NSSAI is associated with a first network slice instance (NSI) of the network; and
    when the S-NSSAI is determined to be associated with the first NSI,
        mapping, by the device, the S-NSSAI to the first NSI to permit the user equipment to communicate via the first NSI using a protocol data unit (PDU) session associated with the S-NSSAI, or
    when the S-NSSAI is not determined to be associated with the first NSI,
        forming, by the device, a second NSI of the network according to the RSC associated with the S-NSSAI, and
        mapping, by the device, the S-NSSAI to the second NSI to permit the user equipment to communicate via the second NSI using a PDU session associated with the S-NSSAI.

2. The method of claim 1, wherein the S-NSSAI is received in at least one of:
    a request from the user equipment to register the user equipment with the network, or
    a request to initiate the PDU session.

3. The method of claim 1, wherein a slice differentiator field of the S-NSSAI identifies at least one of:
    a network slice type (NEST) that identifies one or more characteristics of the network that are to be supported by the first NSI and the second NSI,
    a service, of the network, that is to be utilized by the user equipment,
    an entity associated with the user equipment, or
    an inter-slice priority level that identifies that an NSI that is mapped to the S-NSSAI has a priority relative to other NSIs of the network.

4. The method of claim 1, wherein the RSC identifies a set of resource layers, of the network, that the user equipment can share according to the S-NSSAI.

5. The method of claim 1, wherein determining the RSC comprises:
    determining resource layers that can be shared with another user equipment associated with the S-NSSAI or another user equipment associated with another S-NSSAI,
        wherein the RSC is determined based on the resource layers.

6. The method of claim 1, wherein determining the RSC comprises:
    determining that the S-NSSAI is not associated with a specific RSC;
    determining, based on the S-NSSAI not being associated with the specific RSC, that the S-NSSAI is associated with a default RSC; and
    determining that the RSC is the default RSC, and
    wherein determining whether the S-NSSAI is associated with the first NSI comprises:
        determining, based on the RSC being the default RSC, whether the S-NSSAI is associated with the first NSI of the network based on at least one of:
            a network service type (NEST) of the S-NSSAI, or
            the SST of the S-NSSAI.

7. The method of claim 1, further comprising at least one of:
    provisioning the PDU session, associated with the user equipment, to utilize the first NSI or the second NSI, or
    determining a traffic type of the PDU session;
    overriding, based on the determined traffic type of the PDU session, the S-NSSAI by assigning network slice selection assistance information (NSSAI) to the user equipment; and
    provisioning the PDU session according to the assigned NSSAI.

8. A device, comprising:
    one or more memories; and
    one or more processors, communicatively coupled to the one or more memories, to:
        receive, from a user equipment, single-network slice selection assistance information (S-NSSAI),
            wherein the S-NSSAI is associated with a network,
        determine a resource sharing configuration (RSC) associated with the S-NSSAI;
        identify a slice/service type (SST) of the S-NSSAI;
        identify, based on identifying the SST, a network slice instance (NSI) table associated with the SST;
        determine whether the RSC associated with the S-NSSAI is included in the NSI table;
        determine, based on determining that the RSC associated with the S-NSSAI is included in the NSI table, whether the S-NSSAI is associated with a first network slice instance (NSI) of the network; and
        when the S-NSSAI is determined to be associated with the first NSI,
            map the S-NSSAI to the first NSI to permit the user equipment to communicate via the first NSI using a protocol data unit (PDU) session associated with the S-NSSAI, or
        when the S-NSSAI is not determined to be associated with the first NSI,
            form a second NSI of the network according to the RSC associated with the S-NSSAI, and map the S-NSSAI to the second NSI to permit the user equipment to communicate via the second NSI using a PDU session associated with the S-NSSAI.

9. The device of claim 8, the S-NSSAI is received in at least one of:
a request from the user equipment to register the user equipment with the network, or
a request to initiate the PDU session.

10. The device of claim 8, wherein a slice differentiator field of the S-NSSAI identifies at least one of:
a network slice type (NEST) that identifies one or more characteristics of the network that are to be supported by the first NSI and the second NSI,
a service, of the network, that is to be utilized by the user equipment,
an entity associated with the user equipment, or
an inter-slice priority level that identifies that an NSI that is mapped to the S-NSSAI has a priority relative to other NSIs of the network.

11. The device of claim 8, wherein the RSC identifies a set of resource layers, of the network, that the user equipment can share according to the S-NSSAI.

12. The device of claim 8, wherein the one or more processors, when determining the RSC, are to:
determine resource layers that can be shared with another user equipment associated with the S-NSSAI or another user equipment associated with another S-NSSAI,
wherein the RSC is determined based on the resource layers.

13. The device of claim 8, wherein the one or more processors, when determining the RSC, are to:
determine that the S-NSSAI is not associated with a specific RSC;
determine, based on the S-NSSAI not being associated with the specific RSC, that the S-NSSAI is associated with a default RSC; and
determine that the RSC is the default RSC, and
wherein, the one or more processors, when determining whether the S-NSSAI is associated with the first NSI, are to:
determine, based on the RSC being the default RSC, whether the S-NSSAI is associated with the first NSI of the network based on at least one of:
a network service type (NEST) of the S-NSSAI, or
the SST of the S-NSSAI.

14. The device of claim 8, wherein the one or more processors are further to at least one of:
provision the PDU session, associated with the user equipment, to utilize the first NSI or the second NSI, or
determine a traffic type of the PDU session;
override, based on the determined traffic type of the PDU session, the S-NSSAI by assigning an NSSAI to the user equipment; and
provision the PDU session according to the assigned NSSAI.

15. A non-transitory computer-readable medium storing instructions, the instructions comprising:
one or more instructions that, when executed by one or more processors, cause the one or more processors to:
receive, from a user equipment, single-network slice selection assistance information (S-NSSAI), wherein the S-NSSAI is associated with a network,
determine a resource sharing configuration (RSC) associated with the S-NSSAI;
identify a slice/service type (SST) of the S-NSSAI;
identify, based on identifying the SST, a network slice instance (NSI) table associated with the SST;
determine whether the RSC associated with the S-NSSAI is included in the NSI table;
determine, based on determining that the RSC associated with the S-NSSAI is included in the NSI table, whether the S-NSSAI is associated with a first network slice instance (NSI) of the network; and
when the S-NSSAI is determined to be associated with the first NSI,
map the S-NSSAI to the first NSI to permit the user equipment to communicate via the first NSI using a protocol data unit (PDU) session associated with the S-NSSAI, or
when the S-NSSAI is not determined to be associated with the first NSI,
form a second NSI of the network according to the RSC associated with the S-NSSAI, and
map the S-NSSAI to the second NSI to permit the user equipment to communicate via the second NSI using a PDU session associated with the S-NSSAI.

16. The non-transitory computer-readable medium of claim 15, the S-NSSAI is received in at least one of:
a request from the user equipment to register the user equipment with the network, or
a request to initiate the PDU session.

17. The non-transitory computer-readable medium of claim 15, wherein a slice differentiator field of the S-NSSAI identifies at least one of:
a network slice type (NEST) that identifies one or more characteristics of the network that are to be supported by the first NSI and the second NSI,
a service, of the network, that is to be utilized by the user equipment,
an entity associated with the user equipment, or
an inter-slice priority level that identifies that an NSI that is mapped to the S-NSSAI has a priority relative to other NSIs of the network.

18. The non-transitory computer-readable medium of claim 15, wherein the RSC identifies a set of resource layers, of the network, that the user equipment can share according to the S-NSSAI.

19. The non-transitory computer-readable medium of claim 15, wherein the one or more instructions, that cause the one or more processors to determine the RSC, cause the one or more processors to:
determine resource layers that can be shared with another user equipment associated with the S-NSSAI or another user equipment associated with another S-NSSAI,
wherein the RSC is determined based on the resource layers.

20. The non-transitory computer-readable medium of claim 15, wherein the one or more instructions, that cause the one or more processors to determining the RSC, cause the one or more processors to:
determine that the S-NSSAI is not associated with a specific RSC;
determine, based on the S-NSSAI not being associated with the specific RSC, that the S-NSSAI is associated with a default RSC; and
determine that the RSC is the default RSC, and
wherein the one or more instructions, that cause the one or more processors to determine whether the S-NSSAI is associated with the first NSI, cause the one or more processors to:

determine, based on the RSC being the default RSC, whether the S-NSSAI is associated with the first NSI of the network based on at least one of:
a network service type (NEST) of the S-NSSAI, or
the SST of the S-NSSAI.

* * * * *